Nov. 12, 1940.　　　　　J. G. HOOP　　　　　2,221,583
GAS COMBUSTOR UNIT
Filed June 28, 1938　　　　　2 Sheets-Sheet 1
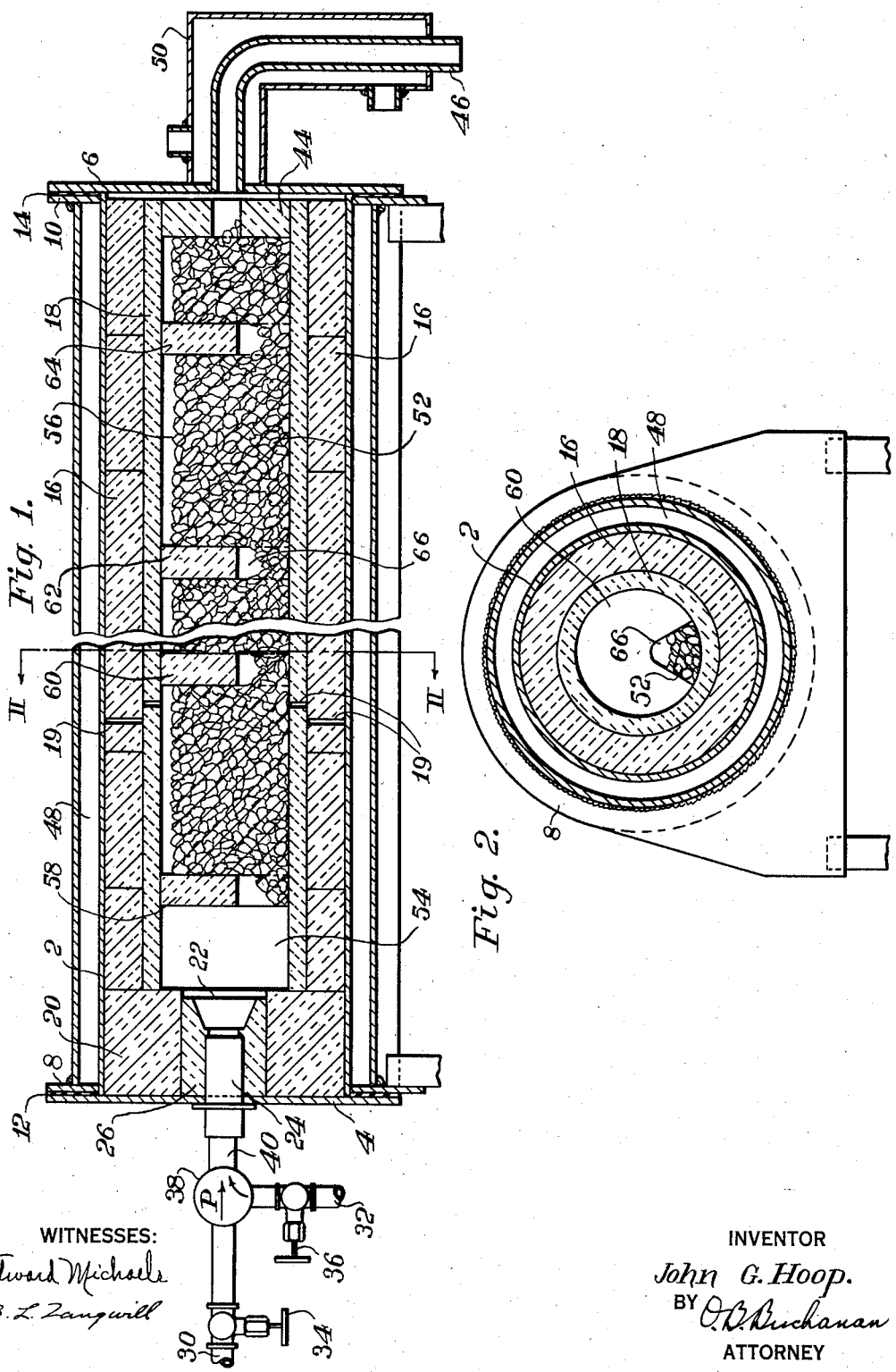
WITNESSES:
Edward Michaels
B. L. Zangwill
INVENTOR
John G. Hoop.
BY O. D. Buchanan
ATTORNEY

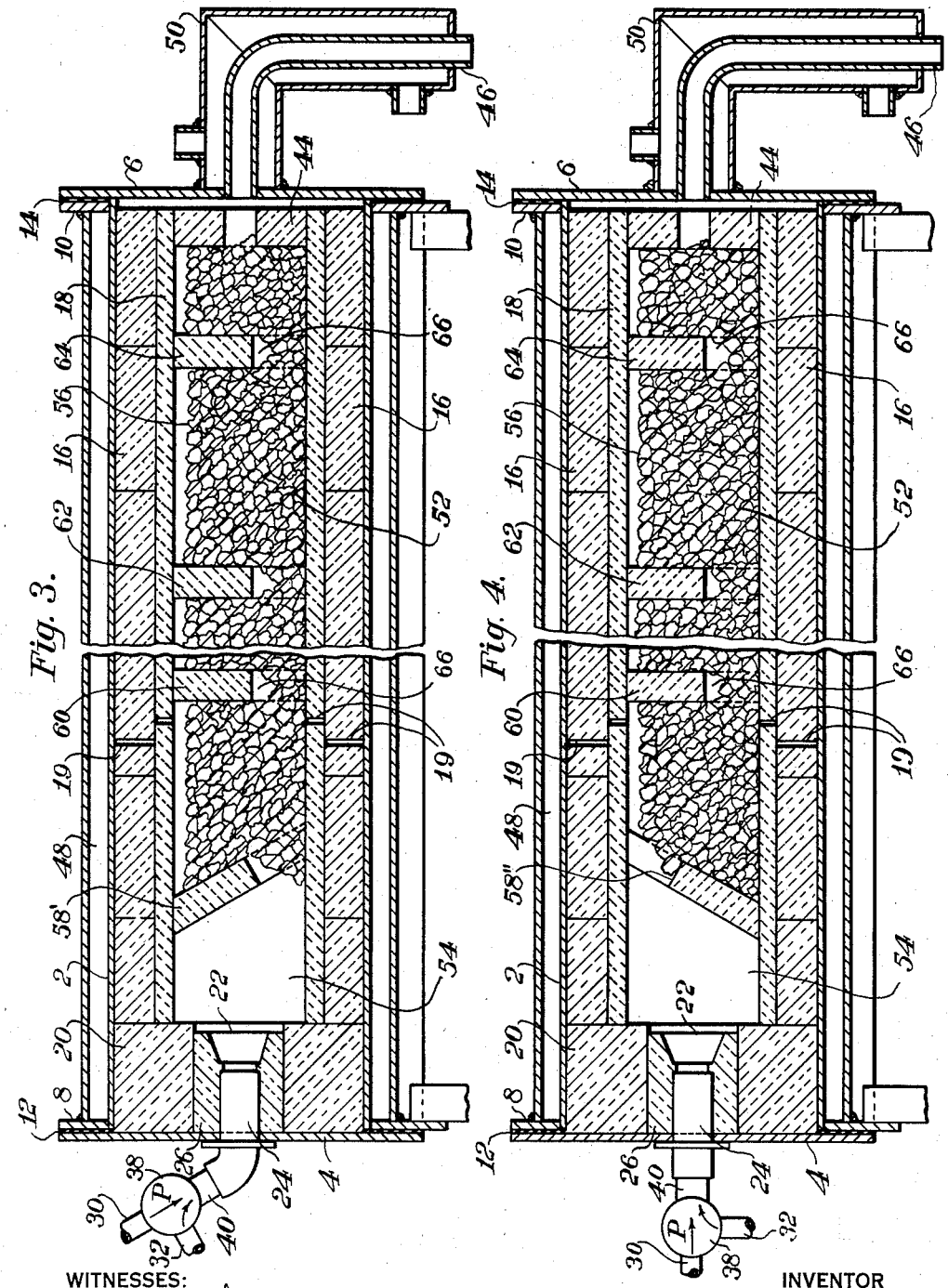

Patented Nov. 12, 1940

2,221,583

UNITED STATES PATENT OFFICE 2,221,583

GAS COMBUSTOR UNIT

John G. Hoop, Pittsburgh, Pa., assignor to Westinghouse Electric & Manufacturing Company, East Pittsburgh, Pa., a corporation of Pennsylvania Application June 28, 1938, Serial No. 216,393

5 Claims. (Cl. 23—281)

This invention relates specifically to a construction for a gas generator or combustor unit which is employed in the production of a protective atmosphere for a furnace, preferably of the electrically heated type. Such units usually consist of a refractory lined chamber of suitable proportions with a burner at one end and an exit opening for the products of combustion at the other end. A mixture of air and a gas such as natural gas, producer gas, or the like, is supplied to the burner in the desired proportions, and the mixture is burned in the unit either partially or completely with the resulting products of combustion led directly, or after additional treatment, to the furnace in which the protective atmosphere is employed to envelop the charge.

It is a common practice to introduce a catalyst in the combustor unit which the gases contact in their progress through the unit for the purposes of promoting combustion or cracking the hydrocarbon gases present, or both. For best results the chamber is filled with pieces of a catalyst except for an open combustion space near the burner, the pieces of catalyst in the remaining portion of the unit providing a large area of contact surface for the burnt and burning gases which flow through the interstices of the conglomerate. I have found, however, that sometimes in horizontal combustor units the exhaust gas mixture did not have the desired and expected composition. Moreover, in some instances, the composition of the gases was not within reasonable uniformity from time to time, although the quality and proportions of the gases supplied to the unit were maintained. I finally discovered, however, that this was due to the tendency of the pieces of catalyst to settle down in the course of time or with continued use.

In vertical combustor units this settling is not very objectionable for the reason that the gases still must pass through the conglomerate. However, in horizontal combustor units the settling down of the pieces of catalyst leaves a channel or channels along the top of the unit and through which a fraction of the gaseous mixture may flow without contacting with very much of the catalyst. This is the condition I have found which gave the undesired and irregular composition of the gas mixture coming out of the unit.

A more consistent composition of the products of combustion of a horizontal unit in which channeling occurs can be obtained by occasionally dismantling the unit and refilling the chamber with new catalyst. However, this method is only palliative since progressive channeling still occurs between refills and gases can pass through the channels. Moreover, this method of refilling, has the objection of requiring a stopping of the process and an unwarranted upkeep expense.

It is, accordingly, an object of my invention to nullify completely the effects of channeling in a horizontal combustor unit due to any cause, but primarily to settling down of pieces of catalyst within the unit.

It is a further object of my invention to ensure that all gases passing through the combustor unit will pass through an appreciable amount of the catalyst.

It is still another object of my invention to overcome the effects of channeling by expedients employed within the unit, so that no dismantling or added upkeep expense is required.

Specifically, I eliminate the possibility of the deleterious effects of channeling by the introduction of baffle walls at intervals along the length of the unit. The baffles are preferably embedded or secured to the inner wall or lining of the combustor unit along the top portions thereof in a substantially gas-tight manner, so that the products of combustion cannot flow in a direct path along the top of the combustor unit at which place the channeling is present. The baffles either terminate above the bottom portions of the combustor unit or have apertures therein to provide free passage of the gaseous mixture below the baffles or through the lower portions thereof. The passages are preferably so low that the pieces of catalyst between the baffles will always be above the uppermost part of the passages despite their continuous settling. The features of the aforesaid structure, of course, provide additional objects of my invention.

Other objects of my invention will be apparent from the embodiments described below which incorporate the teachings of my invention. This description is to be taken in conjunction with the drawings in which:

Figure 1 is a view in vertical cross section of a gas combustor unit employing my invention.

Fig. 2 is a view in cross section taken on the line II—II of Fig. 1.

Fig. 3 is a view in vertical cross section of a modified combustor unit wherein the first baffle is at an angle to provide a somewhat larger combustion chamber for the initial burning of the gases; and Fig. 4 is a view in vertical section of a further modification of a combustor unit.

As has been previously noted, my invention is primarily concerned with gas treatment in combustor units which are to be disposed in a substantially horizontal manner during use. In the embodiment shown in Fig. 1 the combustor unit comprises an outer shell 2 and end plates 4 and 6. This particular embodiment of a combustor unit is circular so that the shell 2 is cylindrical in shape. However, it is quite obvious that my invention is not limited to any particular shape of combustor unit, but applies to any combustor unit horizontally disposed and in which channeling can occur and through which channels the gases in their treatment can pass so that they do not contact the catalyst to any appreciable degree.

The outer shell 2 may have annular plates 8 and 10 secured as by welding to the ends thereof to provide flanges against which the end plates 4 and 6 may abut. The latter end plates are bolted to the flange plates 8 and 10 with gaskets 12 and 14 interposed to ensure a good gas-tight seal.

The shell 2 is lined with refractory brick 16 which has insulating properties. Inward of the lining 16 is a second lining 18 of a more refractory material and this lining forms the walls of the treating and combustion chambers of the unit. Suitable expansion joints 19, properly disposed, permit expansion and contraction of the parts.

At the inlet end of the unit an end wall is provided comprising firebrick lining 20 having a central aperture 22. The end plate 4 also has a central aperture through which may be inserted a burner 24. The burner 24 is unitary with protective refractory brick 26 and is secured to the end plate 4 by means of a gasketed flange. A supply pipe 30 for air and a supply pipe 32 for gas controlled respectively by valves 34 and 36 connect to a pump 38 which pumps the mixture to the burner through a supply pipe 40. The ratio of the air to gas volume may be controlled by the hand valves 34 and 36 or may be controlled by any automatic means or in conjunction with the pump 38, as is known to the art.

Adjacent the exhaust end plate 6 is an end wall of firebrick or the like 44, and an outlet passage is provided in the end wall 44 and end plate 6 for the products of combustion which pass through an outlet pipe 46. From the outlet pipe 46 the products of combustion may be led to other units for additional treatment or may be led directly to a furnace, depending upon the protective atmosphere desired.

A suitable water jacket 48 having inlet and outlet pipes (not shown) may surround the shell 2 in certain instances where the combustion is exothermic to a degree beyond that which is desired. An additional water jacket 50 may be provided around the outlet pipe 46 for the purpose of cooling the products of combustion even to the extent of condensing the water vapor therein.

The interior of the unit is usually filled with a finely-divided catalyst 52 presenting a large contact surface of a substance such as nickel, in such manner as to leave an open space in proximity to the burner 24. This space 54 is the initial combustion chamber for the gas mixture coming from the burner, and the remaining part of the interior of the unit, and which is occupied by the catalyst, may be termed the reaction portion thereof.

In the course of time and with continued use, the catalyst will tend to settle thereby creating passages or channels for the gases along the top portion of the unit. This is indicated by the broken line 56 which is supposed to represent the topmost extent of the catalyst. It is manifest that if only catalyst were present in the interior of the unit, the gases burning in the combustion chamber would rise and flow through the channels to the outlet pipe 46 contacting very little of the catalyst on the journey. Inasmuch as the area of the channel will vary with time, more or less of the total gases present will flow through the channels so that erratic operation of the unit results.

In my new unit I insert a number of baffles 58, 60, 62 and 64 in spaced relation along the length of the unit. The baffles may be cemented or otherwise secured to the walls of a lining 18 in a manner that will result in a substantially gas tight joint with the upper portions of the internal chamber of the unit so that the passage of gases along the channels aforesaid will be completely blocked. However, I space the first baffle 58 a distance from the burner 24 to give a satisfactory catalyst-free combustion chamber 54 for the initial burning and mixing of the gases supplied to the unit.

The baffles in the embodiment shown correspond to the shape of the particular unit being described, although it is obvious that baffles may assume any other shape to correspond to a differently shaped combustor unit. The baffles are not complete discs but have open sectors 66, as shown in Fig. 2, providing passages which will permit gases to flow therethrough in their journey from the combustion chamber 54 to the outlet pipe 46.

Manifestly, the baffles may be constructed in any desired manner and the passages provided therein are not limited to the particular type I have shown. It is, however, important that the uppermost point of the passages in the baffles be substantially below the top of catalyst to insure that the settling of the latter will not be below the passage.

The number of baffles placed within the unit will depend largely upon the length of the latter and the amount of catalyst therein. It may be observed that with the provision of the baffles, none of the gas mixture can flow to any extent through the channels and that to reach the channels between each pair of baffles the gases must pass through an appreciable amount of the catalyst, first, in going up to the channel, and secondly, in passing from the channel downwardly through the passage in the baffle to the succeeding chamber formed by the next pair of baffles.

In view of the tendency of the hot gases to rise, my baffle structure insures an extraordinary intermixing of the gases with the catalyst, besides their other function of blocking the channels aforesaid.

It may be observed that relatively narrow individual sections are formed between any two successive baffles, each section having its gas entrance and gas exit at the bottom thereof formed by the open sectors 66. It is my opinion that the gas coming into each section tends to rise because of its heated condition, because of the tendency for it to seek a flow-path of least resistance which is along the channels, and because of the expansion of the gases due to the increased cross-sectional area for the flow of gases in the section as compared to the cross-sectional area of a sector 66. However, the gases can escape only by flowing to the exit sector. These opposing tendencies cause a very thorough distribution, and perhaps turbulence, of the gas in the catalyst. Accordingly the combustor unit is operated with all its parts active, resulting in the improved and consistent results I have obtained over long periods of use.

In Fig. 3 I show a slight modification of the unit of Fig. 1. In this unit the first baffle 58' adjacent the burner is at an angle which slopes toward the rear of the unit. This provides a smoother flow of combustion products from the combustion chamber to the reaction chamber, and also provides a somewhat more effective combustion chamber, since it removes two of the sharper corners.

Fig. 4 shows an additional modification and is employed to prevent any of the pieces of the catalyst from entering the combustion chamber. The first baffle 58'' in this instance is secured to the bottom wall portions of the interior of the unit, so that the catalyst is dammed by this baffle. The subsequent baffles are designed in accordance with the principles described in the embodiment of Fig. 1.

From the three embodiments described it is apparent that the specific arrangement of the baffles is not of extreme importance. It is, however, very important that the baffles be so arranged and so secured to the refractory lining of the unit that substantially none of the gases flows along the channel path for any appreciable length.

In this description I have referred to the catalyst as formed of small pieces. However, my invention is applicable to any formation of the catalyst so long as it has a tendency to settle as, for example, bunched nickel wire. In the claims, therefore, the term "divided catalyst" includes such formations and others in which the catalyst is not solidly maintained in place.

While I have illustrated my invention in the forms which I believe to be the best modes of application thereof, it is obvious that many changes may be made within the spirit and scope of the novel invention which I have introduced. It is desired, therefore, that the appended claims be given the broadest construction and limited only by the prior art.

I claim as my invention:

1. A gas treatment unit comprising end walls and side walls defining a substantially horizontal interior, a baffle spaced from an end wall to form a combustion chamber therewith and a reaction chamber with the other end wall, a burner for discharging gases into said combustion chamber, additional baffles in said unit, adjacent pairs of which are secured substantially gas tight along the walls at the top of said interior, and delimiting gas passages at the bottom of said interior, said first baffle being slanted with the lower end towards said other end wall, and a finely divided catalyst mass in said reaction chamber which has a tendency to settle while in use, said mass being in such quantity that on settling the level of said mass will be above said passages, and an exit for said gases after they have passed through said catalyst.

2. A substantially horizontal gas combustor and reaction unit through which gases flow in a generally horizontal direction for the production of a controlled or protection atmosphere for use in enveloping a charge undergoing heat-treatment in a furnace or the like, said unit comprising walls including opposed end walls, a baffle spaced from one of said end walls to delimit a combustion chamber therewith and a reaction chamber with the other of said end walls, a burner for discharging gases to be reacted into said combustion chamber, said baffle and walls providing gas-flow passage from the said combustion chamber to said reaction chamber, and additional spaced baffles in said reaction chamber dividing it into sub-sections which have gas entrances and gas exits only along the bottom of said reaction chamber, and a divided catalytic mass, having a tendency to settle in use, in said sub-sections, said mass being in such quantity that on settling the level of the mass is above said gas entrances and exits.

3. A unit in which hydrocarbon gases are to be reacted with air, said unit comprising end walls and connecting walls defining a relatively elongated, substantially horizontal interior, a baffle between said end walls forming a combustion chamber and a reaction chamber in said unit, a burner for discharging said gases into said combustion chamber, a plurality of additional baffles in said reaction chamber arranged successively along its length, immediately successive ones of said additional baffles being secured substantially gas-tight to the walls at the upper portions of said interior, and delimiting gas passages at the bottom of said interior, said first baffle being slanted with its lower end toward said reaction chamber, a finely divided catalyst mass in said reaction chamber, which has a tendency to settle while in use, said mass being in such quantity that on settling the top level of said mass will be above said passages, and an exit for product gases.

4. Apparatus for the production of controlled protective atmospheres by the reaction of hydrocarbon gases and air, comprising combustion means in combination with a housing having walls along its length, said housing comprising a relatively elongated, substantially horizontal reaction chamber, a plurality of baffles spaced along the length of said chamber, successive ones of said baffles being secured substantially gas-tight to the walls at the upper portions of said chamber, and delimiting gas passages substantially only at the bottom of said chamber, a catalytic mass comprising numerous small pieces of catalyst, which has a tendency to settle with continued use, substantially filling the space in said reaction chamber, said passages being considerably below the top of said catalytic mass, said mass being in such quantity that on settling the top level of said mass will be appreciably above said passages.

5. A substantially horizontal gas combustion and reaction unit through which gases flow in a generally horizontal direction for the production of a controlled or protective atmosphere for use in enveloping a charge undergoing heat-treatment in a furnace or the like, said unit comprising walls including opposed end walls and walls connecting said end walls, a baffle spaced from one of said end walls to delimit a combustion chamber therewith and a reaction chamber with the other of said end walls, a burner for discharging gases to be reacted into said combustion chamber, said baffle and walls providing a gas-flow passage through said combustion chamber and said reaction chamber, and additional baffles successively spaced in said reaction chamber dividing it into sub-sections between each pair of successive baffles, said sub-sections having gas entrances and gas exits only along the bottom of said reaction chamber, and a divided catalytic mass, having a tendency to settle in use, in said sub-sections, said mass being in such quantity that on settling the level of the mass will be appreciably above said gas entrances and exits.

JOHN G. HOOP.